Nov. 28, 1967  C. W. KELSEY  3,355,124
CIRCULAR WING STRUCTURE
Filed Dec. 27, 1965
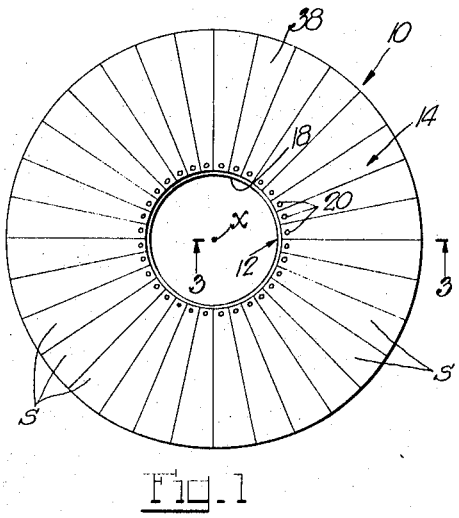
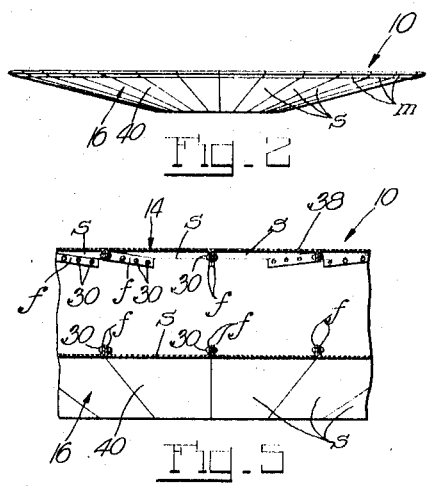
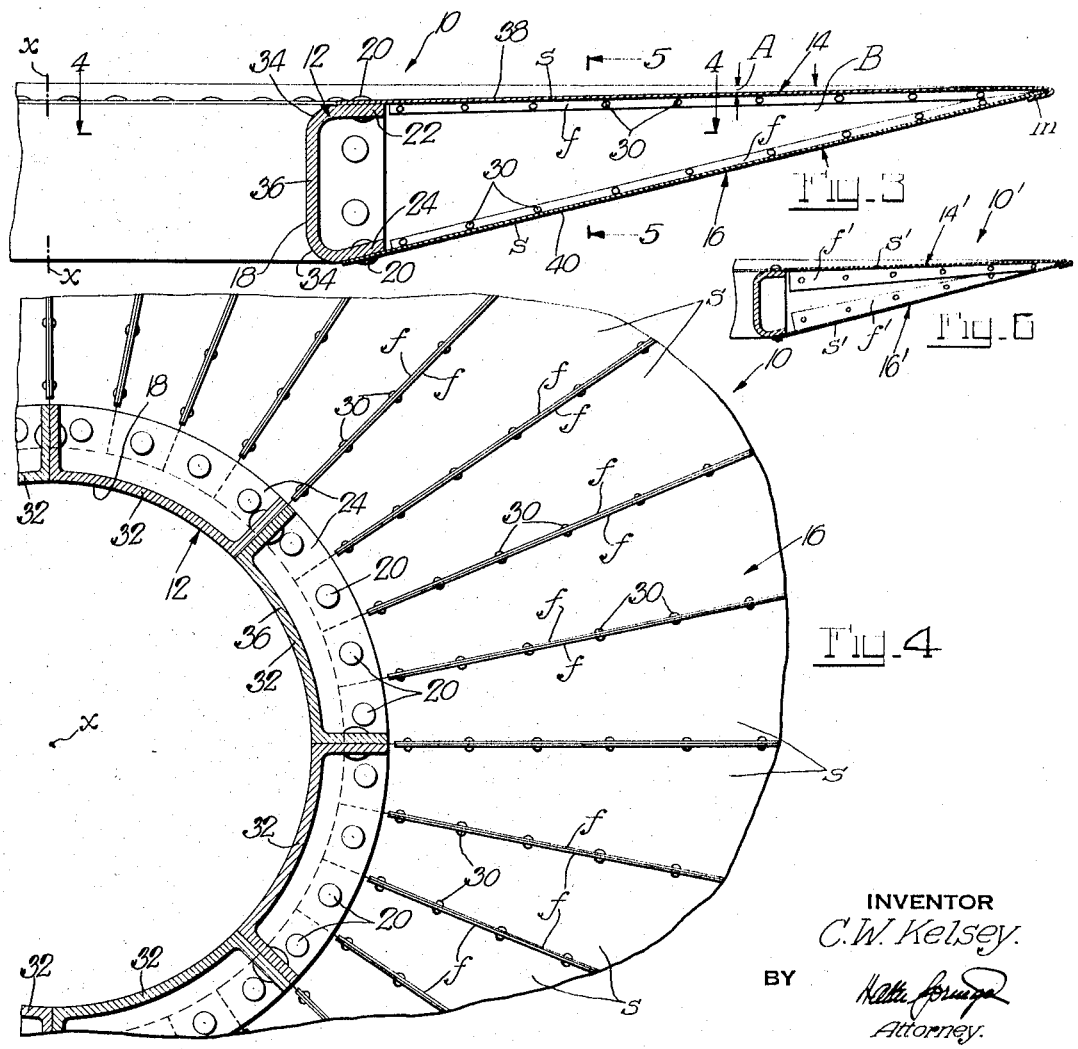
INVENTOR
C. W. Kelsey.
BY
Attorney.

United States Patent Office 3,355,124
Patented Nov. 28, 1967

3,355,124
CIRCULAR WING STRUCTURE
Cadwallader W. Kelsey, Guilford, Conn., assignor to Skycar, Inc., New Haven, Conn., a corporation of Connecticut
Filed Dec. 27, 1965, Ser. No. 516,604
8 Claims. (Cl. 244—35)

This invention relates to vertical take-off aircraft in general, and to a wing structure thereof in particular.

The present invention is concerned with a circular-type wing having a center opening through which to force air downwardly for producing the necessary lift forces on the wing surfaces in all phases of power flight. While known wings of this type are operational, they are deficient, more or less, in a few, though important, respects. Thus, while most of these wings are profiled in section more or less after conventional wings for horizontal take-off with ensuing relatively low lift capacity, the few wings which are profiled differently for better adaptation to the operational air currents prevailing in power flight have but slightly increased lift capacity. Moreover, these prior wings do not have that adequate parachute effect in descent rate and non-sway which makes for reasonable landing safety on a power stall in flight. Also, these wings are invariably of rather complex and costly construction and also rather heavy in weight which factors are hardly conducive to good lift capacity and parachute effect as well as to efficient and low-cost mass production of such wings. Thus, most of these wings have a rigid frame which is covered with a skin, while others have rigid preformed and usually heavily braced sections that are joined together, with the wings being moreover rather massive and having a surface area comparable to that of a low-speed horizontal take-off wing. These prior wings thus constitute a serious obstacle in attaining safe and efficient as well as mass-produced low-cost aircraft of vertical take-off.

It is the primary aim and object of the present invention to provide a wing structure of this type which is superior to the prior wings in lift capacity and parachute effect and lends itself to particularly efficient and low-cost mass production.

It is another object of the present invention to provide a wing of this type which in its more basic design is of general inverted dish shape, and has upper and lower surfaces which among their more prominent characteristics are frusto-conical and, hence, lack any profile curvature. In thus shaping the wing, the air flow about the wing in power flight will produce lift forces which not only are of high total magnitude but also exert themselves more uniformly about the total areas of the upper and lower wing surfaces with resultant safety and reliability in flight as well as quick upward and forward response to the dictates of the applied power and suitable steering provisions, and the parachute effect of the wing on a power stall in flight is largely aerodynamic resistance to descent by virtually the entire upper and lower wing surfaces which is highly conductive to fairly slow and safe as well as rather sway-free descent under most any atmospheric conditions.

It is a further object of the present invention to provide a wing of this type of which the upper and lower surfaces are inverted frusto-cones of relatively small and somewhat larger angles, respectively, which meet at their outer circumference in a relatively thin edge and are joined at their inner circumference by a cylindrical or like surface, so that the section of the wing is in the form of a relatively slender wedge which is particularly well suited for the aforementioned desirable aerodynamic responses of the wing in flight.

Another object of the present invention is to provide a wing of this type which is of exceedingly light weight yet of adequate strength safely to withstand all operational stresses, by constructing the entire wing, except for a lightweight center shell and conventional rivet or other type fasteners, solely from complemental sheets of accustomed skin fabric, such as flexible light-gauge aluminum or like sheet, of virtaully no more expanse than is required for the mere formation of the upper and lower wing surfaces, with the fabric sheets being, by their joinder to each other into the aforementioned frusto-cones, mutually reinforced to lend entirely adequate strength and rigidity to the frusto-conical wing sections. A wing of such construction is easily several times lighter than prior wings of comparable strength, and this remarkably low weight of the wing coupled with its aforementioned particularly good aerodynamic properties gives rise to obvious important advantages, such as permissible exceptionally condensed wing construction for a given flight load and, hence, small span of an aircraft which permits take-off from and landing on most places and no longer requires designated areas of adequate expanse for that purpose, and the construction of an aircraft around the simple but major wing structure in efficient manner so as to make such craft truly competitive, pricewise, with automobiles and attractive to many for reasons for safe and fast travel devoid of the ever increasing hazards of driving on roads and highways, and for other reasons.

A further object of the present invention is to provide a wing of this type in which the aforementioned fabric sheets are preferably and conveniently flat sector-like parts which may readily be blanked from sheet stock and preferably have relatively narrow side margins bent into depending flanges at which successive sections are joined by fasteners or otherwise and which as such, and even far more so by their joinder, heavily reenforce and stiffen the frusto-conical wing sections into which they are assembled, so much so that these wing sections after firm joinder at their inner circumferences with the aforementioned center shall and their joinder at their outer circumferences, have entirely adequate strength and rigidity at a good safety factor. This procedure also lends itself to highly efficient mass production at exceedingly low cost of wings of this type.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a top view of a wing structure embodying the present invention;

FIG. 2 is a side view of the wing structure;

FIG. 3 is an enlarged fragmentary section through the wing structure taken substantially on the line 3—3 of FIG. 1;

FIGS. 4 and 5 are fragmentary sections through the wing structure taken substantially on the lines 4—4 and 5—5, respectively, of FIG. 3; and FIG. 6 is a fragmentary section through a wing structure embodying the present invention in a modified manner.

Referring to the drawings, the reference numeral 10 designates a circular wing with a vertical axis $x$ having a center support 12 and upper and lower wing sections 14 and 16. The wing 10 is in this instance of general ring shape (FIG. 1) and has a central opening 18 which is preferably cylindrical and formed by the center support 12. The support 12 is in the form of a rigid shell to the opposite ends of which the wing sections 14 and 16 are joined. In this instance, the wing sections 14 and 16 are by rivets 20 secured to end flanges 22 and 24 of the center shell 12.

In accordance with one aspect of the present invention, each wing section 14 and 16 is formed solely from flexible sheet material, such as light-gauge aluminum or like sheet, for example, which customarily is used for the cover skin over the framework of conventional wings. Furthermore, each wing section is formed of flat complemental sheets *s* which are joined together at their adjacent margins, with the joints between the sheets lending the wing section adequate rigidity safely to withstand all operational stresses without buckling. In the present instance, the sheets *s* of each wing section are sector-like in shape (FIGS. 1 and 4) and are joined at their adjacent sides. Preferably, side margins of the sector-like sheets *s* in each wing section are bent into depending side flanges *f* of which adjacent ones of successive sheets abut each other and are there joined, in this instance by rivets or other fasteners 30. In thus providing the sheets *s* with the side flanges *f*, the former are already materially stiffened against buckling, and the further joining of these sheets at their abutting side flanges *f* lends each assembled wing section entirely adequate rigidity and strength to withstand all operational stresses without buckling or sustaining other damage. The rigidity of the wing sections 14 and 16 is even further enhanced by the joining of their outer peripheries. However, since the individual wing sections 14 and 16 are in themselves quite rigid, as poined out, and are by their mounting on the center sheel 12 also rather firmly oriented with respect to each other, it is entirely feasible to join the wing sections at their outer peripheries by merely crimping nonflanged peripheral margins *m* of the sheets *s* of the upper wing section 14, for example, over the outer peripheral edges of the sheets *s* of the lower wing section 16 (FIG. 3). If desired, however, recourse may be had to other modes of joining the wing sections at their outer peripheries, such as by riveting, for instance.

The center shell 12, which in this instance is formed of suitably joined complemental sections 32 (FIG. 4), is made of any suitable light-weight material of great strength. Thus, the sections 32 of the shell 12 may advantageously be molded from tough fibers, including glass fibers, and epoxy resin as a binder, for example.

The wing sections 14 and 16 are preferably of inverted frusto-conical shape (FIG. 3), with the frusto-cone of the upper wing section 14 having but a slight angle A and the frusto-cone of the lower wing section 16 having a larger angle B (FIG. 3). Preferably, the top and bottom flanges 22 and 24 of the center shell 12 are formed frusto-conically at the same angles as the thereon mounted upper and lower wing sections 14 and 16 so as to continue the frusto-cones of the latter throughout their radial extent and into close proximity to the smoothly curved merging portions 34 between the flanges 22, 24 and cylindrical wall 36 of the center shell 12 (FIG. 3).

While the exemplary wing 10 is circular, the same may obviously be formed other than circular, such as oval, for example. Also, while there is disclosed only a wing structure, the same may in obvious manner be applied to the rest of a vertical take-off aircraft, such as, for example, by suspending from the center shell 12 a passenger cabin with a power plant for operating blades in the shell opening 18 in a manner suggested in the patent to Taylor, No. 3,055,613, for instance.

The present wing 10 is of exceedingly light weight, yet has entirely adequate strength safely to withstand all operational stresses in flight. Thus, the wing sections 14 and 16, being made exclusively of light-gauge metal sheet, such as aluminum sheet of .025" thickness, for example, of an expanse not appreciably larger than is required for the mere formation of the upper and lower wing surfaces 38 and 40, are exceedingly light in weight, with the overall weight of the wing 10 being not materially increased by the light-weight center shell 12 and such light-weight fasteners that go into the construction of the wing. On the other hnad, the joints of the complemental sheets *s* of the upper and lower wing sections 14 and 16 lend entirely adequate rigidity to the latter which is even greatly enhanced by the preferred formation of side flanges on the sheets at which the latter are joined. The rigidity and strength of the wing sections thus obtained also permits the elimination of any connections, such as braces, between these sections over their total expanse from their outer periphery to the center shell. The present wing also lends itself to highly efficient mass production at exceedingly low cost. Thus, the center shell 12 is made up of simple, inexpensive and readily assembled sections 32, and the individual sheets *s* may advantageously be blanked from sheet stock and simultaneously formed with the side flanges, whereupon the wing sections 14 and 16 may advantageously be assembled separately and subsequently with the center shell and with each other at their outer peripheries, all of which are simple operations performed with relative dispatch and requiring no more than ordinary skill.

The present wing 10 has all of the aforementioned good aerodynamic properties, and for this reason and also because of its exceedingly simple and low cost construction lends itself particularly, though by no means exclusively, for use in vertical take-off aircraft of especially low cost yet safe and reliable performance. Further, owing to the good aerodynamic properties and exceedingly light weight of the present wing, the same may be made of relatively small diametric span for an aircraft of a given flight load. For example, a diametric wing span of 24' has been found entirely adequate for safe flight at a broad range of speeds, including hovering, with a cabin load of two passengers and a power propelling plant of somewhat over two-hundred horsepower. Accordingly, the present wing further lends itself to good use in vertical take-off aircraft of particularly condensed size for take-off from and landing on most any spot, and even in crowded communities.

While in the wing shown in FIGS. 1, 3 and 5 the flanges *f* on the sheets *s* are of relatively narrow width, FIG. 6 shows a wing 10' in which the flanges *f'* on the sheets *s'* are of greater width for added strength and rigidity of the wing without any appreciable increase in weight of the latter. Preferably and advantageously, the flanges *f'* are widthwise tapered as shown (FIG. 6). Also, in order that the flanges *f'* on the sheets *s'* of either wing section 14' or 16' may extend with their full width to the other wing section, as shown, the wing sections are angularly offset from each other so that the flanges *f'* on one wing section are staggered with respect to the flanges *f'* on the other wing section, rather than being vertically aligned as in FIG. 5.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A circular wing structure, comprising a rigid center support with a vertical axis, and substantially circular upper and lower wing sections of which each section is formed of complemental flat flexible metal sheets joined together at adjacent margins thereof, said wing sections being with central parts thereof joined to said support in vertically spaced relation with each other and being secured to each other at their outer peripheries from which they diverge to said support, with said wing sections being over the extent of their divergence from their outer peripheries to said support devoid of any connections between them, and the joints of the sheets of each wing section lending rigidity to the latter.

2. A circular wing structure as set forth in claim 1, in which said metal sheets of each wing section are sector-like in shape and joined to each other at their side margins.

3. A circular wing structure as set forth in claim 2, in which said side margins of the sector-like metal sheets are depending flange formations continuous and integral with the respective sheets, and said flange formations on the sheets of each wing section abutting and being joined to each other.

4. A circular wing structure as set forth in claim 1, in which said upper and lower wing sections are of inverted cone-like form.

5. A circular wing structure as set forth in claim 1, in which for sole peripheral securement of said wing sections to each other an outer peripheral margin of one wing section is crimped about the outer peripheral edge of the other wing section.

6. A circular wing structure as set forth in claim 1, in which said center support is a rigid shell open at both ends, and said wing sections are ring-shaped and joined with their inner peripheries to the opposite ends, respectively, of said shell.

7. A circular wing structure as set forth in claim 3, in which said flange formations are widthwise tapered with their smallest widths being at the outer wing periphery.

8. A circular wing structure as set forth in claim 3, in which said wing sections are angularly arranged relative to each other so that the flange formations of one wing section are staggered with respect to the flange formations of the other wing section.

References Cited

FOREIGN PATENTS 555,937  4/1923  France.

MILTON BUCHLER, *Primary Examiner.*

T. MAJOR, *Assistant Examiner.*